United States Patent [19]

Stevenson

[11] Patent Number: 4,614,013

[45] Date of Patent: Sep. 30, 1986

[54] METHOD OF FORMING A REINFORCED STRUCTURAL BUILDING PANEL

[76] Inventor: David Stevenson, 15833 El Soneto Dr., Whittier, Calif. 90603

[21] Appl. No.: 582,181

[22] Filed: Feb. 21, 1984

[51] Int. Cl.$^4$ ............................. B23K 9/12; E04C 2/26
[52] U.S. Cl. ................................. 29/155 R; 52/309.7; 140/112; 29/460; 219/58; 219/80; 264/45.8; 264/46.7; 264/317; 425/DIG. 12
[58] Field of Search .............. 52/694, 650, 655, 309.7, 52/309.12, 690; 219/58, 56, 80; 140/112; 29/155 R, 460; 264/46.2, 45.4, 45.8, 317, 46.7, 51, 216, 299; 425/DIG. 12

[56] References Cited

U.S. PATENT DOCUMENTS

| | | | |
|---|---|---|---|
| 2,187,129 | 1/1940 | Kramer | 140/112 |
| 2,694,228 | 11/1954 | Mathis | 264/317 |
| 2,939,206 | 6/1960 | Keller | 29/155 |
| 2,957,070 | 10/1960 | Schachter et al. | 219/79 |
| 3,013,924 | 12/1961 | Taft et al. | 156/78 |
| 3,064,345 | 11/1962 | Herman et al. | 29/421 |
| 3,239,982 | 3/1966 | Nicosia . | |
| 3,305,991 | 2/1967 | Weismann . | |
| 3,347,007 | 10/1967 | Hale | 52/650 |
| 3,407,560 | 10/1968 | Baumann | 52/645 |
| 3,427,699 | 2/1969 | Cape | 29/155 |
| 3,555,131 | 1/1971 | Weismann . | |
| 3,705,473 | 12/1972 | Yeffal-Rueda | 52/650 |
| 3,751,869 | 8/1973 | McDonald | 52/650 |
| 3,838,241 | 9/1974 | Weismann | 219/56 |
| 3,879,908 | 4/1975 | Weismann | 52/309.4 |
| 4,079,560 | 3/1978 | Weismann | 52/309.4 |
| 4,104,842 | 8/1978 | Rockstead | 52/650 |
| 4,120,330 | 10/1978 | Weismann | 140/112 |
| 4,236,364 | 12/1980 | Larsson et al. | 52/383 |
| 4,336,676 | 6/1982 | Artzer | 52/309 |
| 4,348,164 | 9/1982 | Fujii | 264/46.2 |
| 4,494,349 | 1/1985 | Clements | 52/648 |

FOREIGN PATENT DOCUMENTS

| | | |
|---|---|---|
| 643884 | 7/1962 | Canada . |
| 301482 | 10/1917 | Fed. Rep. of Germany . |
| 458402 | 4/1928 | Fed. Rep. of Germany . |
| 1150176 | 1/1958 | France . |
| 1355456 | 2/1964 | France . |
| 632345 | 12/1962 | Italy ........................... 52/655 |
| 125023 | of 0000 | Japan . |
| 1322391 | 7/1973 | United Kingdom . |

Primary Examiner—John E. Murtagh
Attorney, Agent, or Firm—Knobbe, Martens, Olson & Bear

[57] ABSTRACT

An insulated welded wire structural building panel and a method for making such panels are disclosed. The panel has a plurality of parallel trusses joined together with cross wires. Each truss is triangular in cross section. A layer of polyurethane foam is provided in the panel spaced from both the front side and the back side of the panel. On one surface of the foam is a layer of solidified viscous material, such as asphalt or a thermoplastic. The cross wires on opposite sides of the panel are offset from each other along the axes of the truss runner wires to which they are welded.

12 Claims, 10 Drawing Figures

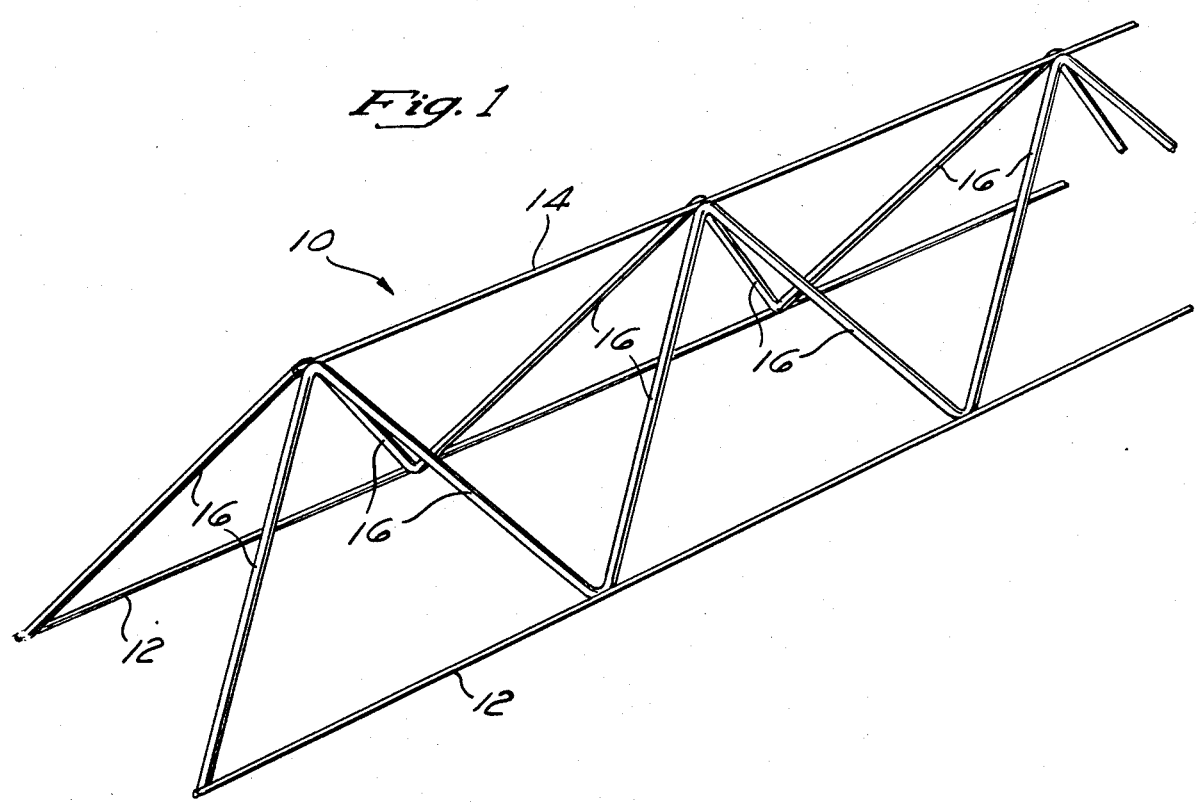
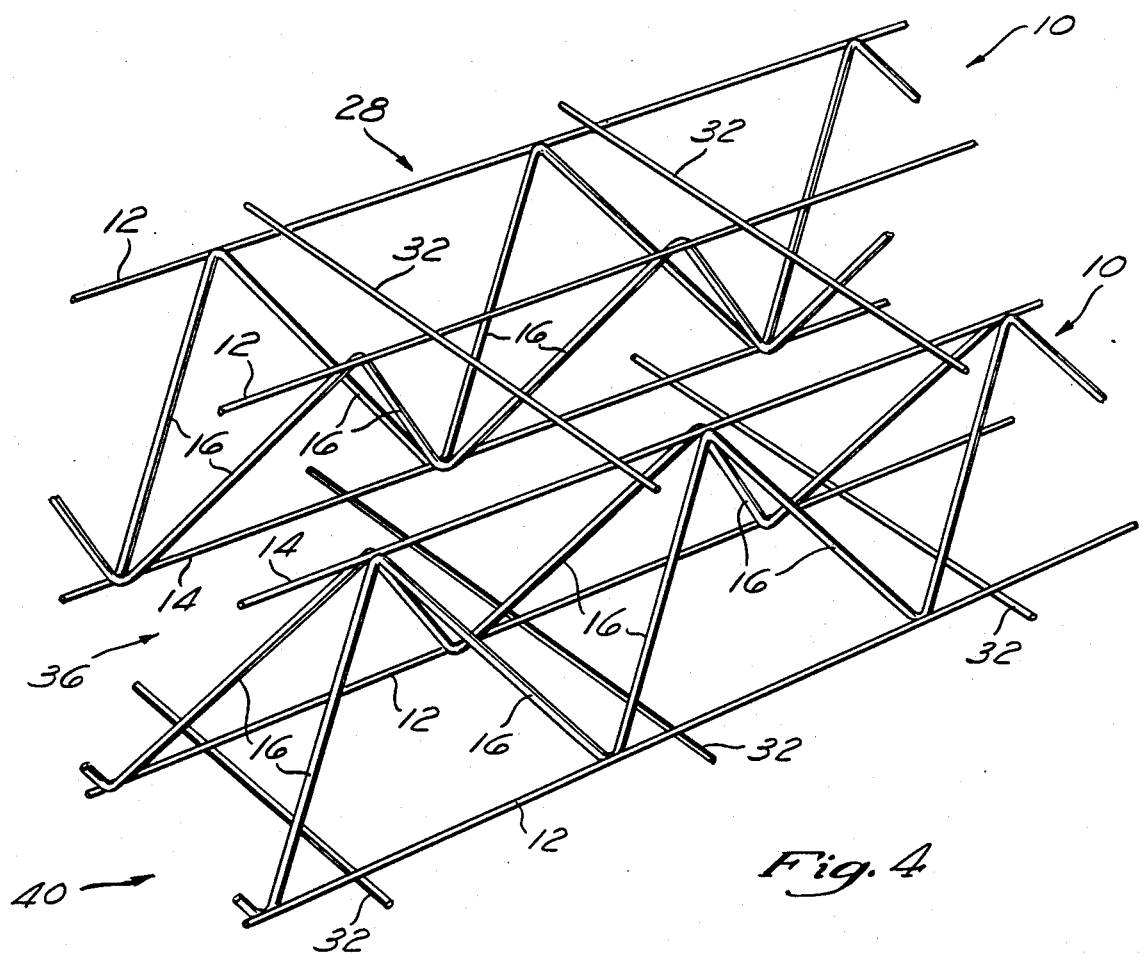

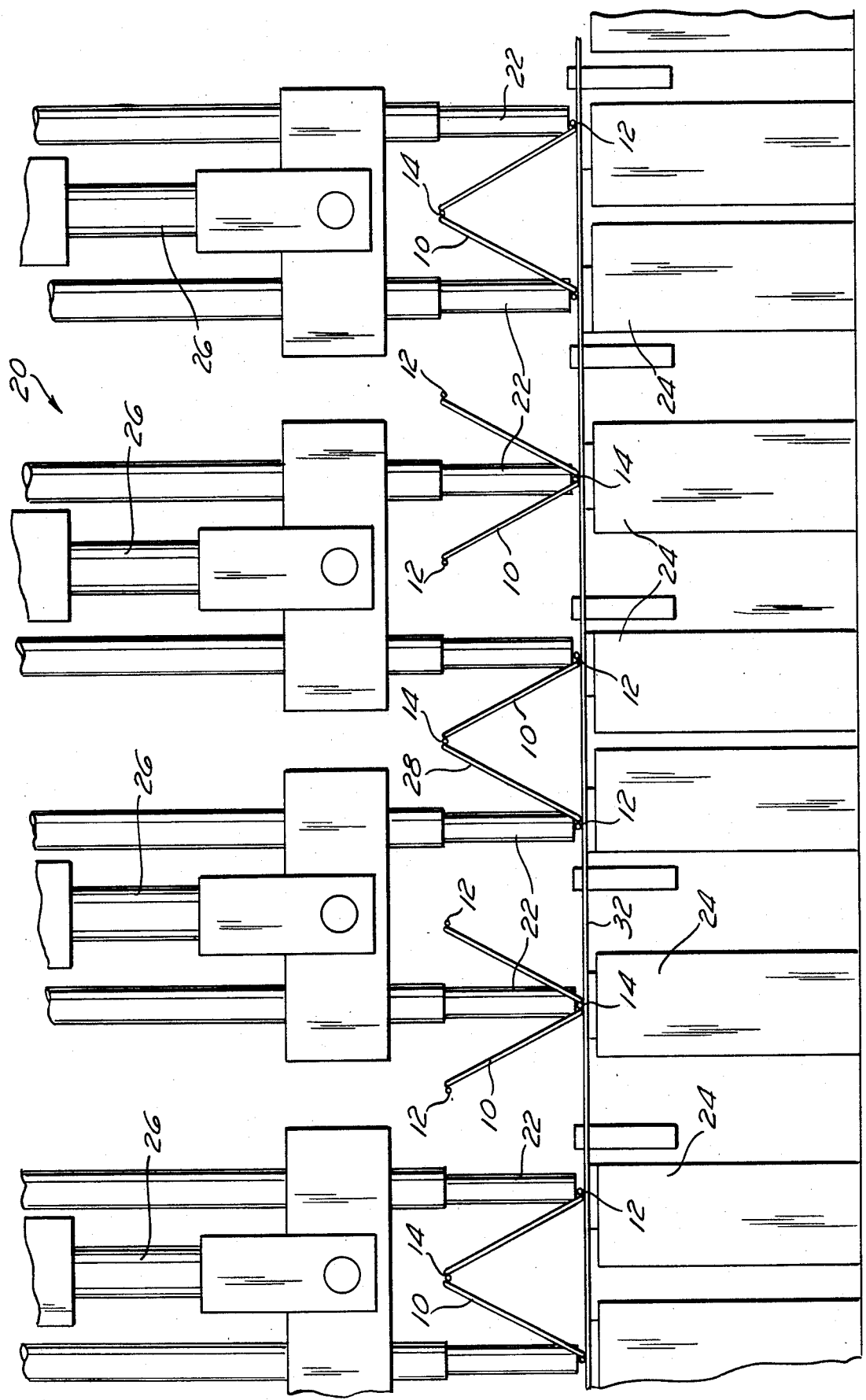

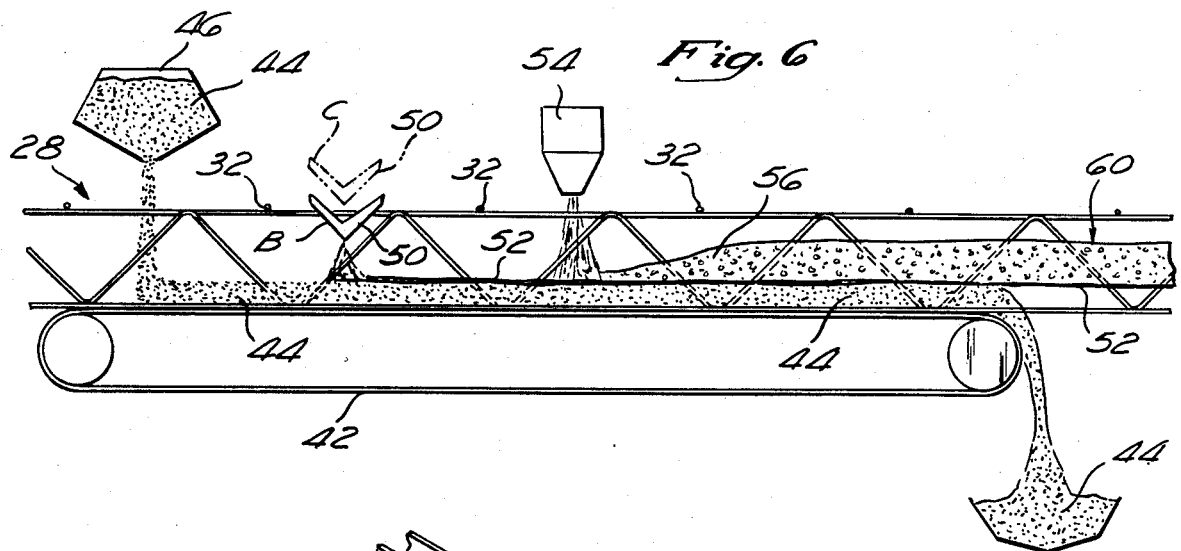
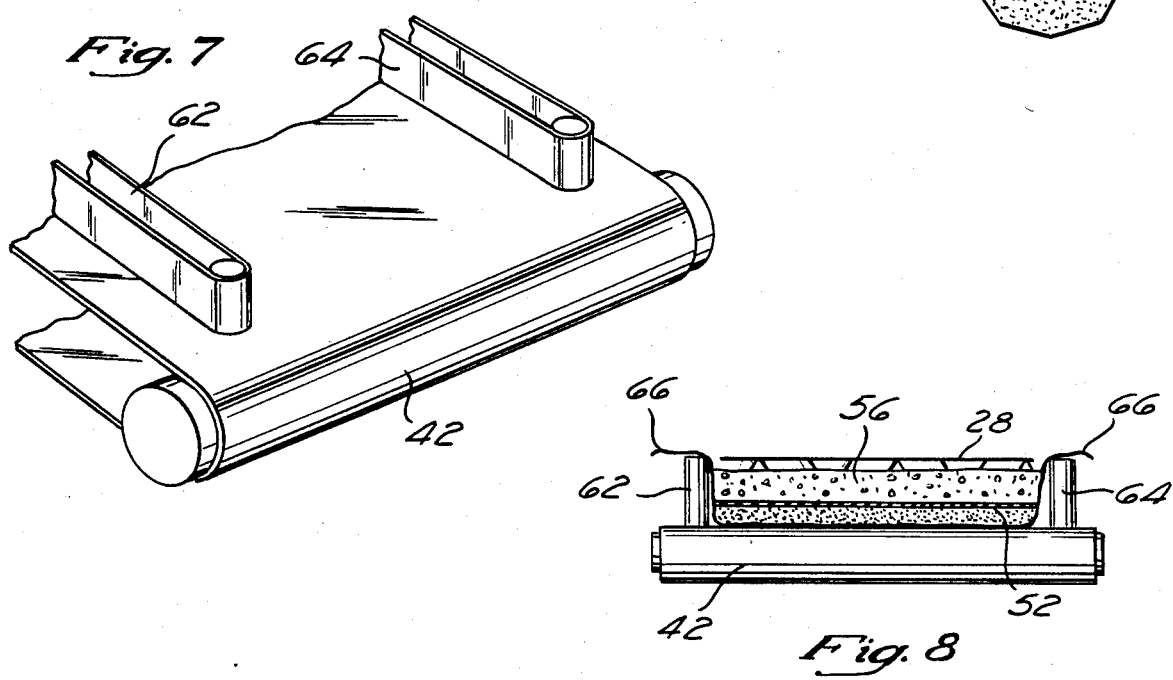
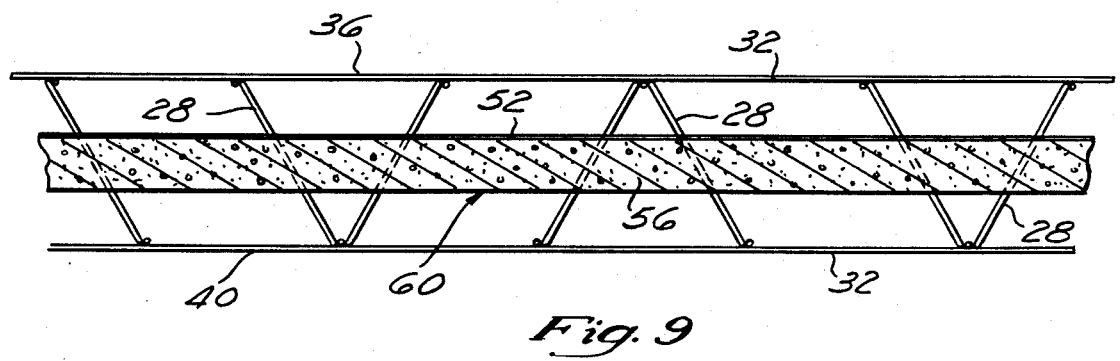

METHOD OF FORMING A REINFORCED STRUCTURAL BUILDING PANEL

BACKGROUND OF THE INVENTION

This invention relates to structural building panels made of welded wire having an insulating foam core. This invention also relates to the method for making the welded wire panel and introducing the foam core thereinto.

The utility of foam-core welded wire structural buildings panels in building construction is well established. See, e.g., U.S. Pat. No. 3,305,991 to Weismann. In the past, such panels have been made of planar trusses having top and bottom runner wires that have been arranged into panels by connecting the top runner wires of each truss together with a plurality of transverse wires and connecting the bottom runner wires together in the same manner.

A layer of polyurethane foam has been placed in the prior art panels by supporting the welded wire matrix on a planar surface, introducing a layer of sand into the matrix through the lattice, and applying a layer of liquid polyurethane resin, together with a blowing agent, on the layer of sand. By controlling the depth of the sand and the depth of he foam, a panel can be produced having a layer of foam in the interior spaced from both the front side and the back side of the panel. This method is explained in U.S. Pat. No. 3,555,131 to Weismann, which is hereby incorporated by reference.

Structures are formed from these panels by connecting the panels together in the shape of the desired structure and coating the panels with a layer of material, such as concrete or plaster.

One of the drawbacks of the prior art panels is that, by their very nature, they must be fabricated with a relatively complex welding apparatus. Because of the geometry of those panels, the cross wires can be welded to the struts only by complex electrode movement. The electrodes must not only move up and down into and out of contact with the matrix wires, they must also move sideways in and out of the matrix. The time required for this electrode movement is a severe limiting factor on production speed. In addition, the welding machines ar necessarily complex and expensive. A typical prior art welding machine is shown in U.S. Pat. No. 3,838,241 to Weismann.

Another disadvantage of prior art processes for making foam core structural building panels is the cost of the foam. For example, the process of U.S. Pat. No. 3,555,131 typically uses over two pounds of polyurethane resin per cubic foot of foam in completed product. Polyurethane resin is relatively expensive, and typically accounts for about 50% of the material cost of the panel.

Finally, because of their construction, the prior art panels do not fully utilize the theoretical structural strength of the wire material.

Accordingly, it is an object of the present invention to provide a simplified method for constructing foam-core building panels.

Another object of the present invention is to provide a welded wire panel that fully utilizes the strength of the wire in a fully trussed configuration.

Still another object of the present invention is to provide an improved foam-core panel having superior moisture barrier and insulating properties while using less polyurethane resin.

SUMMARY OF THE INVENTION

In accordance with the foregoing objects, the present invention provides a method for making a foam-core welded wire structural building panel, including the steps of providing a plurality of welded wire trusses, each truss having two parallel base runner wires, an apex runner wire parallel to and equidistant from the base wires and spaced outside the plane of the base wires, and a plurality of strut wires joining the base wires to the apex wires to form a "V"-shaped truss; arranging the trusses into a parallel, spaced-apart relationship so that some of the runner wires fall into a first plane and the remaining runner wires fall into a second plane; extending a cross wire transversely across the runner wires in the first plane and welding the cross wire to the running wires between a plurality of coaxial electrode pairs, each coaxial electrode pair moving only perpendicular to the first plane into and out of engagement with the wires to be welded; welding a transverse cross wire to the runner wires in the second plane in the same manner as the cross wire was welded to the runner wires in the first plane; advancing the trusses longitudinally and repeating the welding and advancing steps until the trusses are welded into a three-dimensional wire matrix panel.

In accordance with another aspect of the present invention, the foregoing welded wire matrix is supported on a belt; sand is introduced into the matrix onto the belt; a layer of heated, viscous liquid material is placed on top of the sand in the matrix; a layer of organic polymer resin is introduced into the matrix on top of the viscous material and is foamed in place; and the sand is removed to provide a panel having a layer of foam inside that is spaced in from both the front side and the back side of the panel.

Other objects, features, and advantages of the invention will become apparent from the detailed description which follows, when considered together with the accompanying figures of drawing.

BRIEF DESCRIPTION OF THE DRAWINGS

FIG. 1 is a perspective view of a triangular truss having a "V"-shaped cross section.

FIG. 2 is an end view of a panel in the panel welding machine.

FIG. 4 is a perspective view of a portion of the welded wire matrix used in the building panel.

FIG. 6 is a schematic view of the process for introducing the foam into the panels.

FIG. 7 is a partial perspective view of a main conveyor belt having two side belts that may be used in the foaming process.

FIG. 8 is a transverse cross-section of the conveyor belt and a panel in the foaming process.

FIG. 9 is a transverse cross-section of a completed panel.

DETAILED DESCRIPTION OF THE PREFERRED EMBODIMENTS

Figure 3:
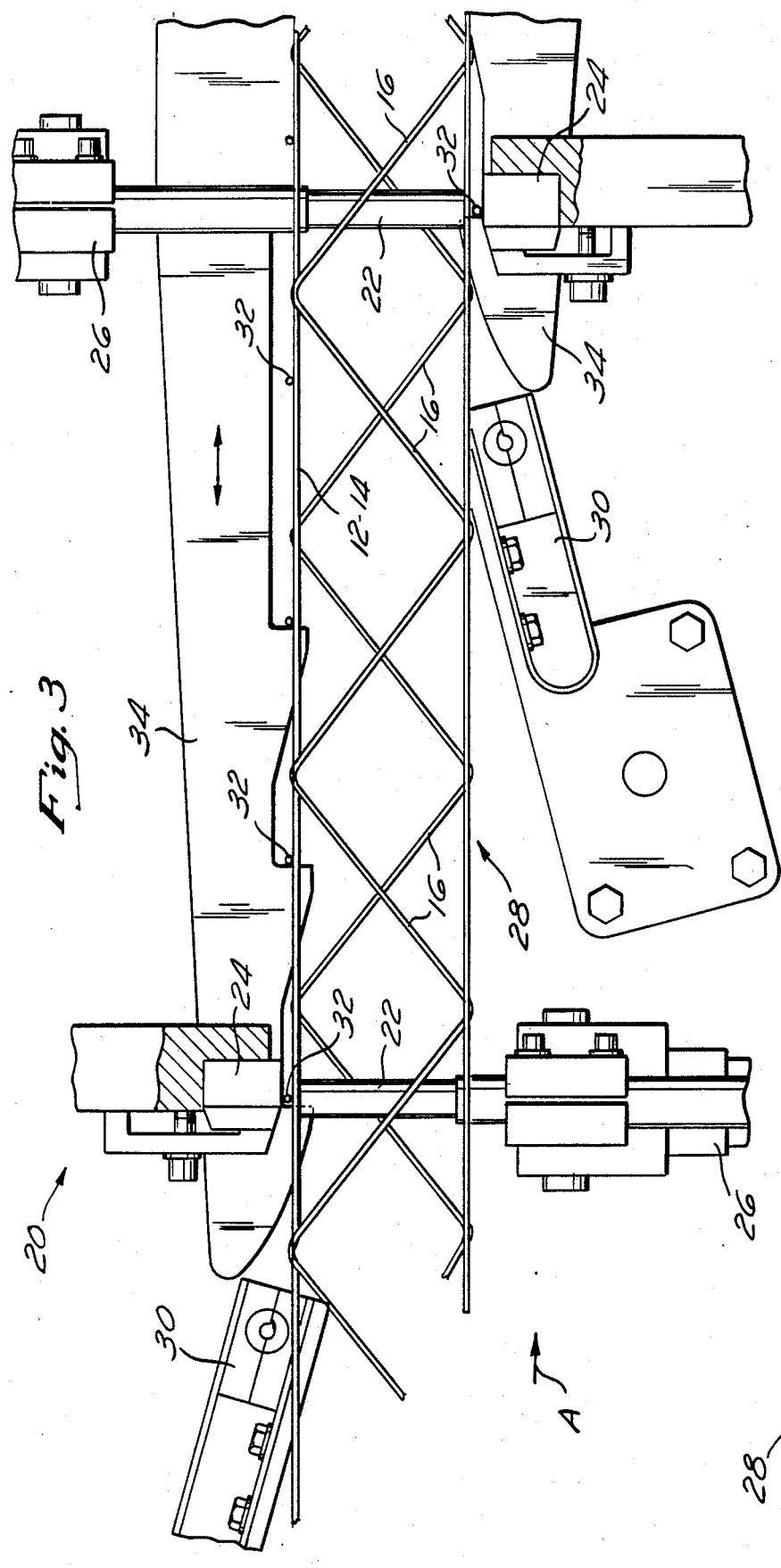
FIG. 3 is a side view of a panel in the panel welding machine showing the welding machine in side elevation.

As is illustrated in FIG. 1, the basic structural unit of the panels of the invention is a triangular welded wire truss 10. The truss 10 has two parallel base runner wires 12 and an apex runner wire 14. The apex runner wire 14 is parallel to the base runner wires 12 but is spaced outside the plane of the base wires 12 and is equidistant from each of the base wires 12. The apex wire 14 is connected to each of the base wires 12 by a plurality of strut wires 16. In a preferred embodiment, the strut wires 16 define a zig-zag path as they interconnect the base wire 12 with the apex wire 14. The strut wires 16 may be separate wires, but are preferably formed from one continuous folded wire. In a preferred embodiment, the diagonal strut wires 16 are a heavier wire than the base wires 12 and the apex wire 14.

Machines for making triangular welded-wire trusses are commercially available, and this invention does not reside in a method for making such trusses. One preferred truss-making machine is the Automatic Welding Line for Truss Girders, Model TZ 7-25, manufactured by Entwicklungs-Und Verwertungs-Gesellschaft mbH (the EVG machine). One of the advantages of the EVG machine is its ability to fabricate trusses from a wide number of wires sizes and, while maintaining the distance between the base wires constant, to provide infinitely variable adjustment of the distance from the apex wire to the base wires.

The panel welding machine is shown schematically in FIG. 2. FIG. 2 corresponds to an end view of a panel being welded in the machine looking along the longitudinal axis of the trusses. The panel welding machine 20 comprises a plurality of coaxial welding electrode pairs. Each electrode pair comprises a reciprocating electrode 22 and a fixed electrode 24. The reciprocating electrodes 22 are moved into and out of the engagement with the wires to be welded by a hydraulic drive 26 to fabricate a welded wire matrix panel 28.

In operation, the trusses to be welded are aligned in parallel fashion and are loaded for advancement into the path of the electrodes 22 and 24. The trusses 10 are maintained in a spaced-apart relationship. The base runner wires 12 and apex runner wires 14 all fall into one of two common planes. The first common plane is defined by all of the runner wires on the top of the panel, and the second common plane is defined by all of the runner wires on the bottom of the panel, with reference to FIG. 2. The alternating truss arrangement shown in FIG. 2 is preferred; i.e., the trusses 10 are alternated so that the apex wire 14 of one truss is in the same plane as the base wires 12 of the adjacent truss. This alternating arrangement is preferable for most applications. However, where a panel will be stressed only by force applied from one side, as in a roof panel, greater loading strength is achieved by arranging all the base wires 12 in one plane and all the apex wires 14 in a second plane.

The operation of the panel welding machine 20 may be best described in connection with FIG. 3. A wire positioner 30 places a cross wire 32 on the runner wires on the top side of the panel between the fixed electrode 24 and the reciprocating electrode 22. The cross wire 32 lies in the same plane as the runner wires and extends transversely across the runner wires at right angles thereto. The reciprocating electrode 22 moves into contact with the apex runner wire 14 or base runner wire 12 across which the cross wire 32 extends, squeezes the two wires against the fixed electrode 24, and applies sufficient current to resistance weld the cross wire 32 to the runner wire. The reciprocating electrode 22 is then moved out of engagement with the welded wires and out of the panel 28 by the hydraulic drive 26.

The advancement mechanism 34 then engages the cross wire 32, moving the trusses 10 forward longitudinally in the direction indicated by arrow A. At the same time, the wire positioner 30 places another wire between the electrodes 22 and 24 and the process is repeated. A second set of electrodes simultaneously welds cross wires 32 to the other side of the panel 28 in the same manner as described above. It should be noted that the cross wires 32 are not directly juxtaposed on the opposite sides of the panel. Instead, they are offset by at least a sufficient amount to prevent interference with the electrode extending through the panel 28 to weld the wire on the opposite side.

Another important aspect of the operation of the panel welding machine is that the reciprocating electrodes 22 need only move in two dimensions; i.e., directly into and out of the panel along a single line perpendicular to the planes in which the runner wires sit. For this reason, the machine 20 may be operated at a much higher rate than prior art panel welding machines, in which more complicated electrode movement is required.

Figure 5:
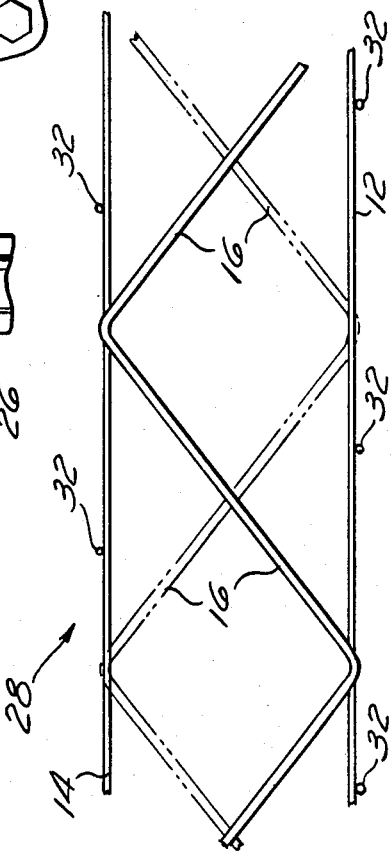
FIG. 5 is a side view through a portion of the welded wire matrix panel in a direction transverse to the length of the trusses.

A section of the welded wire matrix panel 28 is illustrated in FIG. 4. The panel 28 is formed of a plurality of alternating trusses 10. The base runner wires 12 are on opposite sides of the panel in adjacent trusses 10. The panel 28 has a front side 36 and a back side 40. Transverse cross wires 32 run across the base wires 12 and apex wires 14 at right angles and are welded to the runner wires. The strut wire 16 join the front side 36 and the back side 40 by transversing the interior of the panel 28. The alternating trussed relationship of the strut wires in adjacent trusses in the panel 28 is illustrated in FIG. 5. In this view from the side of the panel 28, looking in a direction transverse to the longitudinal direction of the trusses, the strut wires 16 are shown in solid figure and the corresponding strut wires 16 of the adjacent trusses are shown in phantom.

The geometry of this panel approaches theoretical maximum possible panel strength to wire weight ratio. Moreover, the panel may be readily fabricated in any desired depth simply by changing the spacing between the apex wire 14 and the base wires 12 in each truss and moving one bank of electrodes 22 and 24 up or down by a distance corresponding to the change in panel depth. The spacing of the base runner wires 12, the apex runner wires 14, the strut wires 16, the cross wires 32, and the trusses 10 in the panel 28 all remain the same for any panel depth. The advantages over prior art machines, in which truss, strut wire, cross wire, and runner wire position has to be changed for each change in panel depth will be readily appreciated. Preferred panel depths are from two to eight inches, and panels are preferably made in four foot widths and in any desired length from 6 to 40 feet. It will be further appreciated that loading of the trusses 10 into the panel welding machine 20 is greatly simplified in this invention. The triangular trusses 10, of course, are much more rigid than the planar trusses used in the prior art. Moreover, because of their rigidity and "V"-shaped cross section, the trusses 10 may be easily loaded into the panel welding machine 20 by placing them in "V"-shaped grooves or on corresponding ridges (depending upon the desired orientation of the truss)—a vast improvement over the prior art method of loading the planar trusses into snugly, fitting vertical slots that gave the necessary support.

The preferred method for introducing the foam into the panels 28 will now be described. As a preliminary matter, it will be understood that a large number of organic resin foam materials may be used in the present invention. A large number of suitable plastic resin materials are known, the most common of which are polystyrene and polyurethane. Polyurethane is particularly preferred because of its closed-cell structure and high insulating value. Any of the commercially-available blowing agents for the foam may be used. Preferred polyurethanes will have a relatively rapid blowing and setting time period.

As is shown in FIG. 6, the welded wire matrix 28 is placed on a support 42. For production purposes, the support 42 is preferably a conveyor belt. Next, a uniform layer of sand-like granular material 44 is placed on the conveyor 42 through the lattice of the panel 28 from a spreader 46. In a preferred embodiment, the material 44 placed on the belt 42 is sand. Uniformity of the layer of sand 44 may be improved by oscillating the spreader 46 or vibrating the supporting conveyor 42.

The wire matrix panel 28 progresses along the belt to a sprayer 50, which places a layer of viscous material 52 on the surface of the sand. The viscous material 52 is sufficiently viscous that it remains on the sand 44 and forms a covering thereon.

In a preferred embodiment, the viscous material 52 is a hot material such as asphalt, tar, or a liquid thermoplastic material. The sprayer 50 preferably moves into the matrix to apply the viscous material to the sand, thereby avoiding coating the wire matrix 28 with viscous material to an unnecessary extent. In one preferred embodiment, the sprayer 50 is pivotally mounted to drop down into the matrix into position B shown in solid figure. In position B, the flow of viscous material out of the sprayer is actuated. As the matrix advances, the cross wire 32 contacts the sprayer, pivoting it up out of the matrix into position C indicated in phantom. After the cross wire 32 has passed, the sprayer 50 once again pivots down into the matrix and resumes spraying in position B. In a preferred embodiment, a plurality of sprayers 50 are used in order to ensure uniform disbursement of the viscous material 52 over the sand 44.

The matrix, having a layer of sand 44 and a layer of viscous material 52 therein, progresses beneath foam nozzle 54. The foam nozzle 54 places a layer of a liquid organic polymer resin containing a blowing agent on the viscous material 52. As has been explained, the preferred foam material is polyurethane. It is further preferred that the isocyanate and the polyol that react to form the polyurethane are mixed in the foam nozzle itself.

The organic polymer material expands and solidifies into a foam layer 56. It is preferred that the foam layer 56 be a rigid foam. The thickness of the layer 56 is controlled by the amount of polymer material delivered by foam nozzle 54.

The sand 44 is then removed, leaving a foam-core panel 60. As is shown in FIG. 9, the resulting panel has a layer of foam 56 and a layer of viscous material 52 in the interior, both of which layers are spaced inward from the front side 36 and the back side 40 of the panel.

In a preferred embodiment, the conveyor 42 is flanked on either side by side conveyor belts 62 and 64. These side belts 62 and 64 form with the conveyor 42 a channel for containing the sand and the foam. This avoids the prior art problem of waste resulting from foam extending significantly beyond the edges of the panel 28. It is preferred that the side belts 62 and 64 rest on top of the conveyor 42 and that the edges of the conveyor 42 extend beyond the side belts 62 and 64 to catch any overspill of sand or foam.

In another preferred embodiment, a liner 66 is used to protect the side belts 62 and 64. This liner 66 is placed over the side belts 62 and 64 prior to introduction of the sand 44. The liner 66 reduces maintenance by preventing viscous material 52 and foam 56 from sticking to the side belts 62 and 64 and the conveyor belt 42. The liner 66 may be made of any thin, disposable, lightweight web. Preferred materials are paper and plastic film.

The use of the layer of viscous material 52 results in significant advantages over the prior art. It has been discovered that the prior art method of foaming over sand resulted in entrainment of the sand into the foam. This had a twofold effect. First, the entrained sand affected the polyurethane cell structure and resulted in an open-cell structure at the sand-foam interface. The open cell structure reduced insulative value and barrier properties of the foam. In addition, by rupturing the closed-cell structure of the foam, the sand decreased the amount of expansion of the polymer material, thereby increasing foam density and increasing foam costs. Despite the long standing nature of this problem, and the resulting expense, it was never solved in the prior art.

The viscous material 52 forms a barrier between the foam and the sand, preventing entrainment of the sand and the foam and preserving the cellular structure of the foam. Moreover, it has been discovered that vastly superior results are achieved when the viscous material is heated. Polyurethane resin expands best at temperatures of at least 180° F., and preferably at 210° F. Because sand is a good insulator, it is not commercially practicable to heat it to that temperature. Moreover, since sand has a large surface area, it loses heat quickly. On the other hand, a viscous material, such as a liquid thermoplastic or asphalt, provides an excellent source of exothermic energy to facilitate blowing. Accordingly, the present invention permits foam densities of approximately 1.2 pounds per cubic foot as compared to from 2 to 2.2 pounds per cubic foot in the prior art. Not only is the insulative value of the foam improved by decreasing the density, but the cost of the panels is reduced considerably. Foam typically accounts for 50% of the material costs of the panel, and reducing foam cost by 30% to 45% has a significant effect on profitability. Although paraffin, acrylic or latex based material, and polyester resins may be used, the preferred viscous materials are asphalt and melted thermoplastics.

Figure 10:
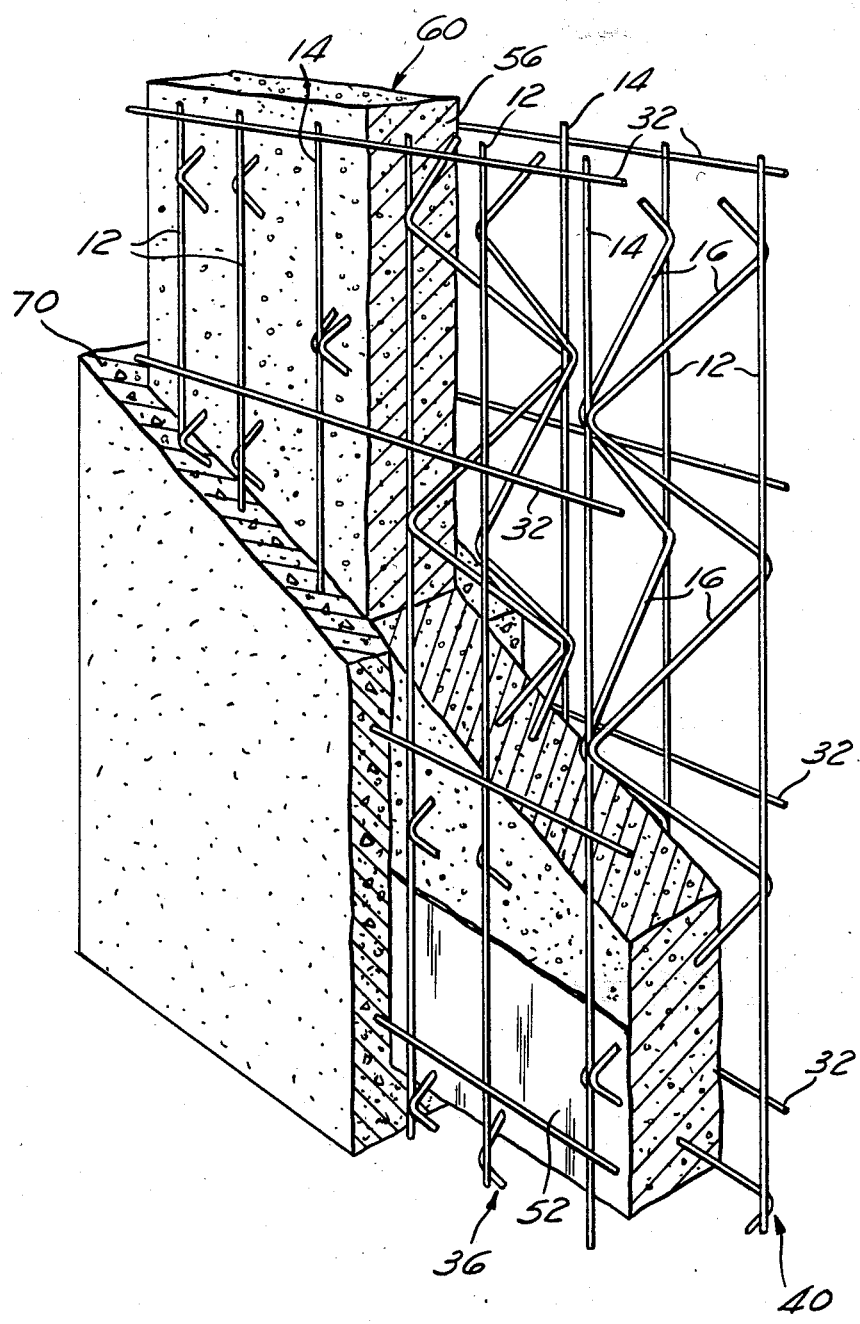
FIG. 10 is a partially cut-away perspective view of a portion of the panel as used in a building.

A portion of the finished panel, as used in building construction, is shown in a partially cut-away view in FIG. 10. The panel 60 has a layer of rigid, closed-cell foam material 56 spaced in from both the front side 36 and the back side 40 of the panel 60. On one side of the foam material 56 is a layer of solidified viscous material 52.

A number of panels 60 may be connected together in the form of a structure. After the panels 60 are braced, they are coated on at least one side with a layer of concrete on plaster 70. The concrete or plaster material 70 may be applied either by hand or, preferably, with a pressurized nozzle or gun as is known in the art. The layer of concrete or plaster 70 embeds the cross wires 32, the runner wires 12 and 14, and the portions of the strut wires 16 that are not embedded in the viscous material 52 or the foam 56.

What is claimed is:

1. A method for forming a structural building panel, comprising the steps of
    (a) providing a plurality of discrete welded wire trusses, each said truss having two parallel base runner wires, an apex runner wire parallel to and equidistant from said base wires and spaced outside the plane of said base wires, and a plurality of strut wires joining said base wire to said apex wires to form a truss having a "V"-shape in longitudinal cross section;
    (b) arranging a plurality of said trusses into a parallel, spaced-apart relationship so that some of the runner wires fall into a first plane and the remaining runner wires fall into a parallel second plane;
    (c) extending a cross-wire transversely across the runner wires in the first plane and welding said cross wire to said runner wires between a plurality of electrode pairs, each electrode pair moving only perpendicularly to said first plane and into and out of engagement with the wires to be welded;
    (d) welding a transverse cross wire to the runner wires in the second plane in the same manner as in step (c) and advancing the trusses longitudinally;
    (e) repeating steps (c) and (d) until the trusses have been welded into a three-dimensional wire matrix panel having a first side and a second side;
    (f) supporting the first side of the matrix panel on a conveyor belt;
    (g) introducing a sand-like granular material into the matrix on the belt to form a uniform layer inside the matrix;
    (h) introducing a layer of viscous liquid material onto the sand-like granular material;
    (i) placing a layer of foaming liquid organic resin material on the viscous material; and
    (j) expanding and solidifying said foam material.

2. The method of claim 1, wherein said foam material is polyurethane.

3. The method of claim 2, wherein said viscous material is heated.

4. The method of claim 1, wherein said belt is provided with sides to contain said sand-like granular material, said viscous material, and said foam material.

5. The method of claim 4, further comprising the step of lining the sides of the belt with a web of thin, disposable material prior to introducing the granular material into the matrix.

6. A method for forming a welded wire matrix panel, comprising the steps of:
    (a) providing a plurality of welded wire trusses each said truss having two parallel base runner wires, an apex wire parallel to and equidistant from said base wires and spaced outside the plane of said base wires, and a plurality of strut wires joining said base wire to said apex wires to form a truss having a "V"-shape in longitudinal cross section;
    (b) arranging a plurality of said trusses into a parallel, spaced-apart relationship so that some of the runner wires fall into a first plane and the remaining runner wires fall into a parallel second plane;
    (c) extending a cross wire transversely across the runner wires in the first plane and welding said cross wire to said runner wires between a plurality of discrete electrode pairs, each electrode pair moving only perpendicularly to said first plane and into and out of engagement with the wires to be welded;
    (d) welding a transverse cross wire to the runner wires in the second plane in the same manner as in step (c) and advancing the trusses longitudinally; and
    (e) repeating steps (c) and (d) until the trusses have been welded into a three dimensional wire matrix panel.

7. A method of claim 6, wherein each cross wire in said first plane is offset along the axis of said runner wires from the corresponding cross wire in said second plane on the opposite side of said panel.

8. The method of claim 6, further comprising the steps of:
    supporting a first side of the wire matrix panel on a surface;
    introducing a layer of granular material into the matrix on the surface to form a uniform layer inside the matrix;
    introducing a layer of foaming liquid organic resin material over the granular material; and
    expanding and solidifying said foam material.

9. A method for introducing a foam core into a welded wire matrix panel, comprising the steps of:
    supporting a first side of the wire matrix panel on a conveyor belt;
    introducing a sand-like granular material into the matrix on the belt to form a uniform layer inside the matrix;
    introducing a layer of heated viscous liquid material onto the sand-like granular material;
    placing a layer of foaming liquid organic resin material on the heated viscous material; and
    expanding and solidifying said foam material.

10. The method of claim 9, wherein said foam material is polyurethane.

11. The method of claim 8, wherein said belt is provided with sides to contain said sand-like granular material, said viscous material, and said foam material.

12. The method of claim 11, further comprising the step of lining the sides of the belt with a web of thin, disposable material prior to introducing the granular material into the matrix.

* * * * *